Figure 1:
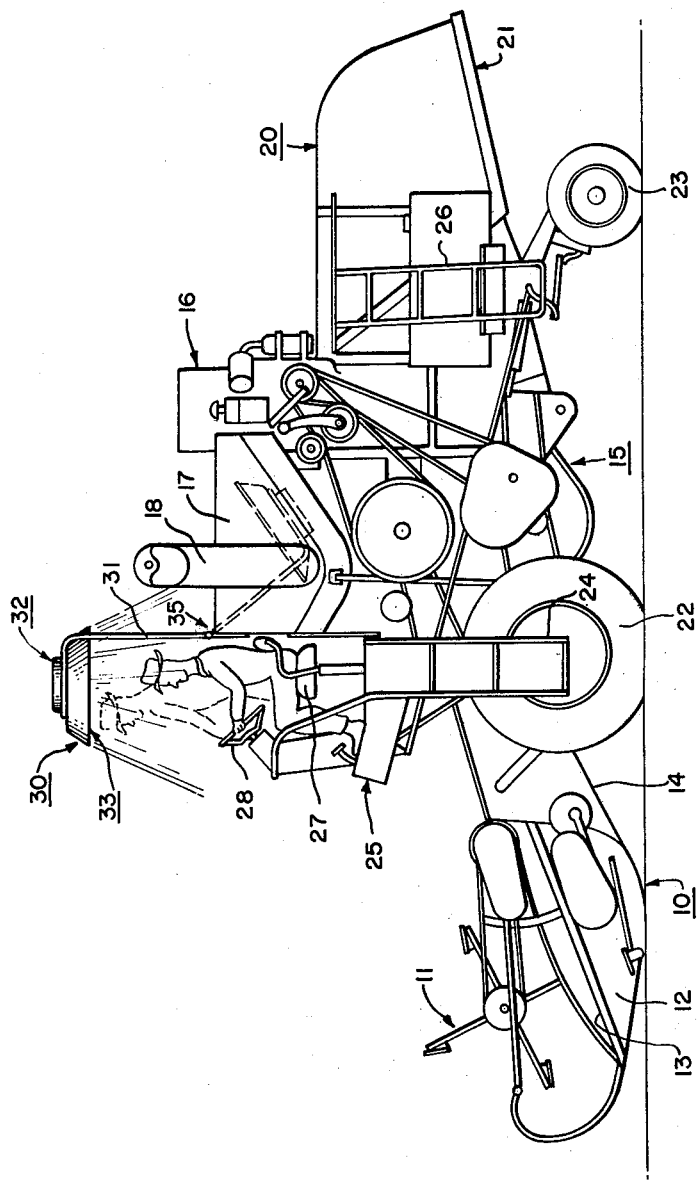

March 31, 1964 E. K. KARLSSON ETAL 3,126,810
DUST DISPERSAL APPARATUS

Filed Nov. 20, 1961 2 Sheets-Sheet 1

INVENTORS
Elof K. Karlsson
Ernest M. Van Buskirk
Paul O. Pippel
Atty.

March 31, 1964  E. K. KARLSSON ETAL  3,126,810
DUST DISPERSAL APPARATUS

Filed Nov. 20, 1961  2 Sheets-Sheet 2

INVENTORS
Elof K. Karlsson
Ernest M. Van Buskirk

Atty.

3,126,810
DUST DISPERSAL APPARATUS
Elof K. Karlsson, Moline, and Ernest M. Van Buskirk, East Moline, Ill., assignors to International Harvester Company, Chicago, Ill., a corporation of New Jersey
Filed Nov. 20, 1961, Ser. No. 154,393
1 Claim. (Cl. 98—36)

This invention is directed to a novel apparatus for protecting human operators of machinery against dust, and more particularly to a novel and unobvious structure for safeguarding the operator of agricultural equipment against the health and vision hazards posed by dust which is ordinarily raised from the soil during the various crop handling processes.

In many different farming operations machinery such as a tractor, mower, combine, or other apparatus is driven through a field to process a crop which is either growing in the field or laying on the ground therein. Passage of the machinery through the fields necessarily raises some dust and dirt therefrom, which dirt is carried upwardly by the air currents produced both by movement of the vehicle and by displacement of the various elements on the vehicle in the crop treating operations. The harvesting and threshing operations cannot be efficiently carried on in fields which are moist, although such conditions would minimize the dust problem. As the field conditions become sufficiently dry to ensure good harvesting and threshing operations, the quantity of dust and dirt particles raised correspondingly increases. The presence of such particles adjacent the operator's position on the equipment not only poses a health hazard, such as the inhalation of abrasive crop particles, but further represents a visibility hazard, thereby decreasing the accuracy with which the machine can be controlled as it traverses the field. Inasmuch as such conditions are frequently encountered by the operator of a combine (or harvester-thresher), it will be convenient to explain both the construction and operation of a preferred embodiment of the invention as utilized in conjunction with a combine.

A primary object of the present invention is the provision of means adjacent the operator's position to prevent the passage of dust and dirt particles adjacent such position, thereby protecting both the health and visibility of the operator.

A more specific object of the invention is the provision of such protection by means of an air stream passing adjacent the operator, the air stream being of a high velocity at a distance from the operator to prevent the intrusion of dust particles but of a substantially lower velocity in the vicinity of the operator to protect the operator against drafts.

Another object of the invention includes the utilization of a portion of the protective air currents to assist in laying down the crop as mowed and gathered at the front portion of the combine, thereby to assist the feeding of the crop from the mowing portion of the combine toward the crop treating areas.

The foregoing and other objects of the invention are realized, in one preferred embodiment, by the incorporation of air movement means at substantially the highest level of the combine, a location at which clean air is generally present. The air movement means or fan is energized from any of the conventional power sources included on the combine, such as a hydraulic motor arrangement. The fan is provided with a dual air stream output arrangement, to provide both a high velocity discharge and a low velocity discharge. In accordance with the invention, the high velocity air stream is directed outwardly of the operator's platform to effectively form a curtain of air which safeguards the operator against the health and visibility hazards which would otherwise be engendered by the moving particles. The low velocity air is passed near the operator's position to provide good ventilation without excessive drafts. Further in accordance with the invention, the outer or high velocity air current continues downwardly near the front of the combine to assist in laying down the crop as cut and gathered, thereby to facilitate the feeding of the crop into the crop treating portions of the combine.

Figure 2:
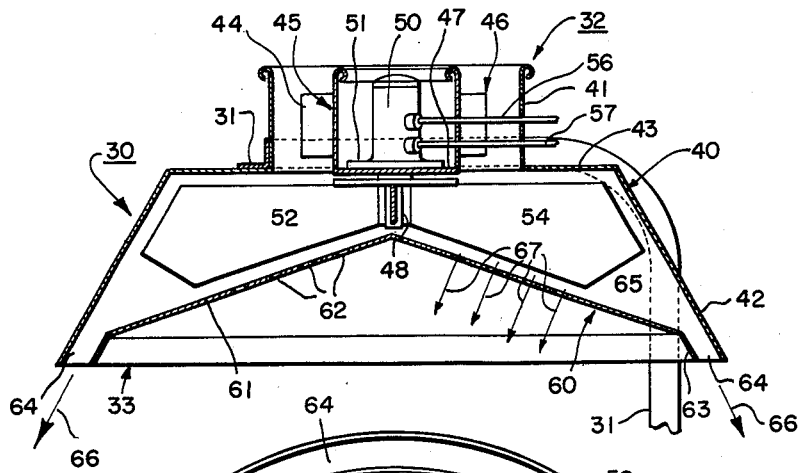
Figure 3:
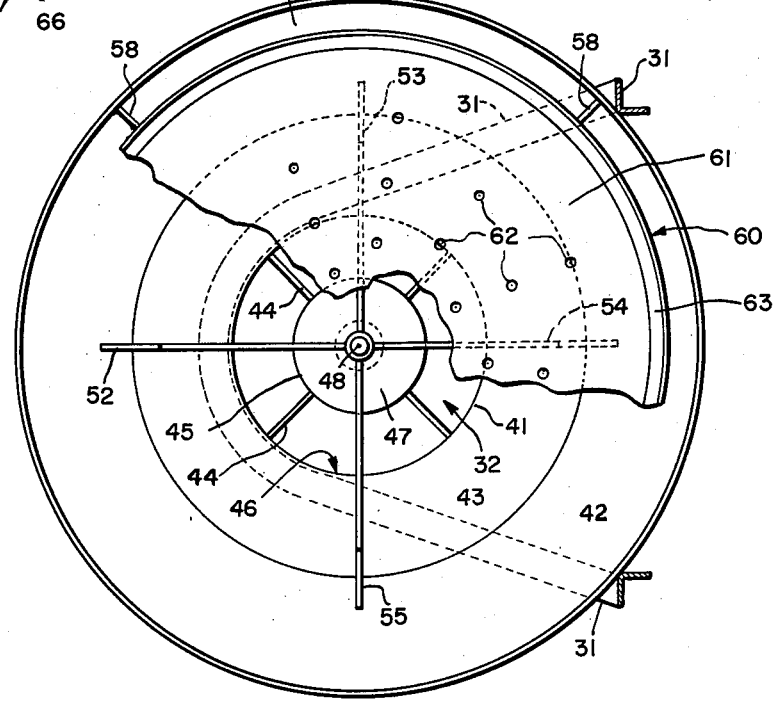

The best mode contemplated for carrying out the invention will now be described. To enable those skilled in the art to make and use the invention, such description is set forth in connection with the accompanying drawings, in the several figures of which like reference numerals identify like elements, and in which:

FIGURE 1 is a side view of a combine with which an embodiment of the invention has been incorporated; and FIGURES 2 and 3 are side and bottom views respectively, taken on a scale enlarged with respect to the scale of FIGURE 1, and partly in section and partly broken away to better illustrate the various features of the inventive structure.

*Structure of the Invention*

As shown in FIGURE 1, a conventional combine structure includes a front or cutting portion 10 comprising a reel 11 for feeding the standing grain between dividers 12 toward a knife (not visible) for cutting thereby and laying down upon the platform 13, for movement by conveyor means disposed within housing 14 from the front or harvesting portion 10 of the combine to the central or threshing portion 15. The combine further comprises a motor or power unit 16 for translating energy over a plurality of drives to the various moving elements of the combine, and a grain tank 17 with a grain tank unloader 18 in the upper central portion of the combine. A discharge unit 20 is located at the rear of the combine, together with an opening or chute 21 for discharging the straw onto the ground after the threshing operation. Also visible are one of the front drive wheels 22 and one of the rear wheels 23, a mounting ladder 24 leading to the operator's platform 25, and a rear access ladder 26 providing a means of reaching the motor of the combine.

The operator's deck 25 supports an adjustable seat 27 and a steering wheel 28 in a well-known manner. The outline of the operator in a sitting position is indicated in solid lines, and at his option he may rise to a standing position (as indicated by the dashed lines) to better view the crop alignment, direct the course of the combine, minimize fatigue during threshing, etc. In accordance with one embodiment of the present invention, an air movement means 30 is positioned at substantially the higest level of the combine, and supported thereat by a bracket 31 affixed between air movement unit 30 and grain tank 17. Bracket 31 includes a pivotable joint 35 to afford rotation of the fan unit into the transport position as depicted by broken lines in FIGURE 1. A locking means, such as a pin (not shown), can be utilized to maintain the bracket 31 in an upright position, as shown in solid outline, during operation of the combine.

Unit 30 comprises an intake portion 32 and a discharge portion 33, with the discharge portion providing a low velocity air stream centrally of the fan unit for passage downwardly over and adjacent the operator, and further providing a high velocity air curtain downwardly from the periphery of discharge unit 33, to effectively provide a protective curtain of high velocity air completely around the position normally occupied by the operator of the combine. The various details of the air movement apparatus will now be described in connection with FIGURES 2 and 3.

As shown in FIGURE 2, the mounting and support bracket 31 which extends upwardly from the grain tank of the combine is affixed to and supports an outer air guide element or hood 40, which may be formed of sheet metal or similar material. Element 40 includes an upper cylindrical section 41 and a lower flared portion 42, interconnected by a central portion 43 as indicated. A plurality of support ribs 44 (FIGURE 3) are provided to support a central cylindrical portion 45 as indicated in FIGURE 2, portion 45 including a sidewall element for defining an annular entrance aperture 46 in conjunction with segment 41 of element 40. Element 45 further comprises a base portion 47, suitably apertured to facilitate the passage therethrough of a mounting shaft 48 which depends from the center of a hydraulic motor 50 mounted centrally within element 45 on a mounting base 51. A plurality of fan blades 52—55 are affixed to the central shaft 48, and two of these blades, 52 and 54, are visible in FIGURE 2. An intake line 56 and a discharge line 57 are provided and intercoupled with hydraulic motor 50, to provide for the passage of fluid under pressure through the motor to propel shaft 48. Lines 56 and 57 may be coupled to any suitable point on the combine or other apparatus which provides a fluid, such as oil, under pressure.

A plurality of vertical connecting elements 58, two of which are visible in FIGURE 3, are provided to maintain the inner conical element or deflector 60 positioned as shown in FIGURE 2. Element 60 comprises an upper V-shaped portion 61, suitably pierced to define a plurality of apertures 62, and a lower skirt portion 63. Skirt portion 63, together with the lowermost portion of section 42 of element 40, defines an annular discharge channel 64 which is one of the discharge exits from the interior of chamber 65, which chamber is defined essentially by the V-shaped section 61 of element 60, and by sections 42 and 43 of element 40.

*Operation of the Invention*

In considering operation of the invention, and referring especially to FIGURE 2, as the fluid under pressure is supplied through intake line 56 motor 50 effects the rotation of shaft 48 and the fluid is discharged through line 57. Rotation of shaft 48 effects angular displacement of blades 52—55, which blades are suitably curved to provide for movement of the air stream within chamber 65 downwardly from top to bottom as shown in FIGURE 2. The greater portion of this volume of moving air is discharged outwardly through the annular channel 64 as indicated by the arrows 66, providing a high velocity air curtain which in effect forms a protective sheet completely around both the operator and the operator platform 25 of the combine to protect the operator against abrasive crop particles, dust, dirt, etc. Simultaneously only a small portion of the moving air within chamber 65 passes through the relatively small area defined by all of the aperture 62 taken together, which air is driven downwardly generally as indicated by the arrows 67 in FIGURE 2 and past the operator and the operator platform of the combine. This moving air is substantially clean, being taken from the highest point of the combine, and is moved past the operator to provide good ventilation but at a speed sufficiently slow so that there is no air blast to disturb or chill the operator. In addition to ventilation, the moving air provides a cooling effect which is highly desirable in that the harvesting-threshing operation is normally carried out during the hottest portion of the summer.

It is evident that the invention fulfills a long-felt need in this art, inasmuch as certain crops provide particles which are abrasive even when rubbed against the skin, and substantially more so if inhaled and retained within the operator's lungs. Accordingly, practice of the invention provides substantial protection for the health of the operator, as well as facilitating his visibility by maintaining dust particles and heavier dirt at a sufficient distance from the control station so that the crop to be cut and the machine can readily be viewed.

Although only a particular embodiment of the invention has been described and illustrated, it is apparent that alterations and modifications may be made therein, and it is intended in the appended claim to cover all such modifications and alterations as may fall within the true spirit and scope of the invention.

What is claimed is:

In an agricultural machine having an operator's position situated thereon, a fan unit comprising a hood having an air inlet and forming a downwardly opening concavity, means for supporting said hood on an agricultural machine such that the downwardly opening concavity overlies an operator's position, a fan mounted on said hood internally of said concavity and adapted to force air toward an operator's position, a deflector secured to said hood about its lower edge, said deflector being in the form of a conical member and being spaced inwardly from the hood's lower edge and providing means for directing an annular curtain of high velocity air around an operator's position, said deflector having a plurality of apertures formed therein providing means for directing a flow of low velocity air downwardly over an operator's position.

References Cited in the file of this patent
UNITED STATES PATENTS

| | | |
|---|---|---|
| 2,604,840 | Loosli | July 29, 1952 |
| 2,627,217 | Hainke | Feb. 3, 1953 |
| 2,817,281 | Schwan | Dec. 24, 1957 |
| 2,837,020 | Gaspardo | June 3, 1958 |
| 2,860,566 | Allsup | Nov. 18, 1958 |

FOREIGN PATENTS

| | | |
|---|---|---|
| 229,390 | Australia | May 11, 1960 |